(12) United States Patent
Lee (10) Patent No.: US 7,607,077 B2
(45) Date of Patent: Oct. 20, 2009

(54) MOBILE COMMUNICATION TERMINAL AND OPERATING METHOD THEREOF

(75) Inventor: Won Woo Lee, Kunpo-si (KR)

(73) Assignee: LG Electronics Inc., Seoul (KR)

( * ) Notice: Subject to any disclaimer, the term of this patent is extended or adjusted under 35 U.S.C. 154(b) by 633 days.

(21) Appl. No.: 11/413,101

(22) Filed: Apr. 28, 2006

(65) Prior Publication Data

US 2006/0253772 A1    Nov. 9, 2006

(30) Foreign Application Priority Data

Apr. 29, 2005    (KR) .................... 10-2005-0036216

(51) Int. Cl.
*G06F 17/00*    (2006.01)
(52) U.S. Cl. ...................... 715/203; 715/230
(58) Field of Classification Search ................ 715/202, 715/209, 230, 256
See application file for complete search history.

(56) References Cited

U.S. PATENT DOCUMENTS

| | | | | |
|---|---|---|---|---|
| 5,594,660 A | * | 1/1997 | Sung et al. ................... | 715/203 |
| 5,642,171 A | * | 6/1997 | Baumgartner et al. ....... | 348/515 |
| 5,765,164 A | * | 6/1998 | Prasad et al. ............. | 707/104.1 |
| 6,130,987 A | * | 10/2000 | Tanaka ........................ | 386/96 |
| 6,163,646 A | * | 12/2000 | Tanaka et al. ................. | 386/96 |
| 6,480,902 B1 | * | 11/2002 | Yuang et al. ................ | 709/248 |
| 6,728,312 B1 | * | 4/2004 | Whitford et al. ....... | 375/240.01 |
| 2004/0090455 A1 | * | 5/2004 | Iida ............................ | 345/728 |

FOREIGN PATENT DOCUMENTS

KR    0133846 B1    4/1998

* cited by examiner

*Primary Examiner*—Adam M Queler
(74) *Attorney, Agent, or Firm*—Birch, Stewart, Kolasch & Birch, LLP

(57) ABSTRACT

The present invention relates to a mobile communication terminal and operating method thereof in which data sync error occurring when multimedia data is played can be compensated for. The mobile communication terminal includes a speaker through which played multimedia data is output, a display unit on which text data are output, an multimedia controller that analyzes and plays multimedia data, compensates for error of an output time, which is generated as the multimedia data are played, and outputs compensated text data, and a controller that manages data when multimedia data is played, and controls the driving of the speaker and the display unit. Temporal error between output time information and an audio signal that is actually output, and proportional temporal error occurring in proportion to an output time are calculated. Temporal information is compensated for based on the calculated temporal error and proportional temporal error.

9 Claims, 7 Drawing Sheets

MOBILE COMMUNICATION TERMINAL AND OPERATING METHOD THEREOF

BACKGROUND

1. Field of the Invention

The present invention relates to a mobile communication terminal and operating method thereof. More particularly, the present invention relates to a mobile communication terminal and operating method thereof, in which output error between multimedia data that are played and text data that are output on the screen, while multimedia data including text data are played, is measured, sync error is compensated for and text data are then output.

2. Discussion of Related Art

Recently, with the development of digital technology, digital multimedia data play devices are diversified and have multiple functions. In line with this trend, the devices abruptly replace the existing products and are rapidly popularized.

More particularly, there is a tendency that MP3 players replace the existing portable cassette players, CD players and so on because of the development of a high-performance CPU and DSP, a lower price of a flash memory used as a storage medium, the easiness of securing content through Internet development and the like.

The MP3 player function is also included in the mobile communication terminal. Therefore, a user cannot only make a phone call, but can also listen to music anywhere and anytime using the mobile communication terminal. Furthermore, the mobile communication terminal can download music content through a mobile communication network. This enables a variety of contents to be used.

The mobile communication terminal can also download text information (the words of a song) along with music content. Accordingly, not only the words of a song can be output on the screen while music is played, but a singing room function is provided.

However, the mobile communication terminal is problematic in that sync error is generated between text information output on the screen while music is played and an audio signal of the music in playing the music and outputting the text data as described above.

This is because in a process in which a multimedia data play program and play means of the mobile communication terminal convert and process multimedia data, a time lag occurs between an audio signal that is actually output through the speaker and output time information about music managed in the play program of the mobile communication terminal.

In other words, the mobile communication terminal searches sync information of a text based on output time information of the multimedia data play program when the text is output, and outputs corresponding text data on the screen. Accordingly, if error is generated between the output time information and the audio signal that is actually output as described above, sync error occurs in the text that is output.

In this case, in the process of processing a large quantity of data for a short period of time in the mobile communication terminal, a difference in the speed occurs between the play program and the play means or a time lag occurs while compressed multimedia data are converted.

In addition, in the mobile communication terminal, the longer the music output time, the greater the error accumulated. In the case where functions such as fast wind, rewind and section repeat are performed, temporal error between the output time information and the audio signal that is actually output is further great.

SUMMARY OF THE INVENTION

Accordingly, an object of the present invention is to solve at least the problems and disadvantages of the background art.

An embodiment of the present invention relates to a mobile communication terminal and operating method thereof, in which output error between an audio signal that is actually output and output time information of a multimedia data is measured, a compensation value accordingly is calculated and text data are output based on the compensation value, thereby compensating for sync error between an audio signal that is actually output and text data.

A mobile communication terminal according to an embodiment of the present invention includes a speaker through which audio data are outputted, a display unit on which text/image data are outputted, a multimedia controller that analyzes multimedia data, compensates for error of an output time of the text data based on the compensated output time. The multimedia controller includes a multimedia data play unit that plays selected multimedia data and updates output time information according to the play of multimedia data, an error compensation unit that calculates compensated temporal information based on a difference between output time information of the multimedia data play unit and an output audio signal, and a text output unit that outputs text data based on the compensated temporal information of the error compensation unit.

The multimedia data play unit may comprise a data analysis unit that analyzes a header of the multimedia data in order to play the selected multimedia data, and an address measurement unit that measures address information about the output audio signal while multimedia data is played.

The error compensation unit may comprise a temporal information calculation unit that calculates temporal information about the output audio signal based on the measured address information, and an error calculation unit that calculates compensated temporal information by calculating temporal error based on the calculated temporal information.

The error calculation unit may calculate temporal error between output time information of the multimedia data play unit and the temporal information of the output audio signal.

The error calculation unit may calculate proportional temporal error occurring in proportion to the output time based on the calculated temporal error.

A method of operating a mobile communication terminal, the method according to an embodiment of the present invention includes the steps of analyzing and playing multimedia data, comparing output time information depending on the play of multimedia data and temporal information of an output audio signal and compensating for temporal error based on the comparison result, and outputting text data based on the calculated compensated temporal information.

The step of compensating for the temporal error may comprise the steps of measuring temporal information of an audio signal output through a speaker, comparing the output time information and the temporal information of the output audio signal to obtain temporal error, and calculating compensated temporal information depending on the temporal error.

In accordance with a mobile communication terminal with a text sync correction function and operating method thereof according to an embodiment of the present invention, temporal error between output time information and an audio signal that is actually played, and proportional temporal error occurring in proportion to an output time are calculated. Temporal information is compensated for based on the calculated temporal error and proportional temporal error. Accordingly, user convenience can be enhanced since sync error can be automatically corrected even without modifying additional text sync.

Furthermore, in accordance with a mobile communication terminal and operating method thereof according to an embodiment of the present invention, sync error between multimedia data that are played and text data is prevented to enable an accurate text output. Accordingly, the reliability of products can be improved.

BRIEF DESCRIPTION OF THE DRAWINGS

A more compete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF PREFERRED EMBODIMENTS

Hereinafter, a mobile communication terminal and operating method thereof will be described in detail in connection with specific embodiments of the present invention with reference to the drawings.

It is to be understood that embodiments of a mobile communication terminal according to the present invention may exist in plural numbers and only the most preferred embodiment will be described below.

Furthermore, in the present embodiment, a case where multimedia data are MP3 will be described as an example. However, the present invention is not limited to the example, but may be applied to a variety of multimedia data formats.

In addition, in an apparatus and method for correcting sync error between an audio signal that is output and text data, the apparatus is not limited to a mobile communication terminal, but may be applied to any multimedia play apparatuses that can play music and/or motion pictures and output text data.

Figure 1:
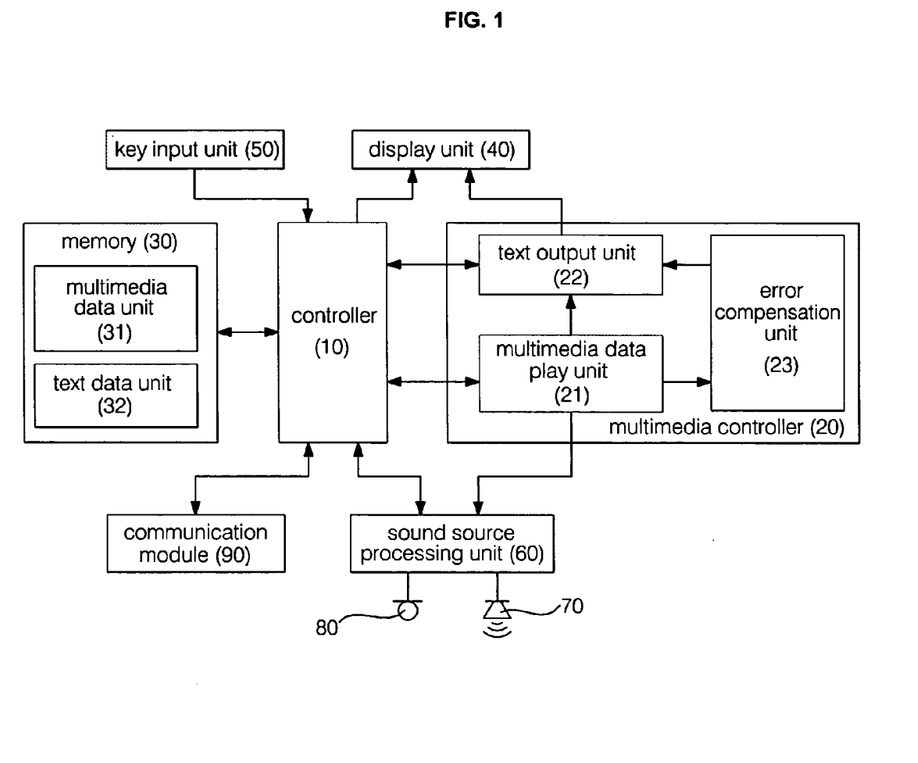
FIG. 1 is a block diagram showing the construction of a mobile communication terminal according to an embodiment of the present invention.
Figure 2:
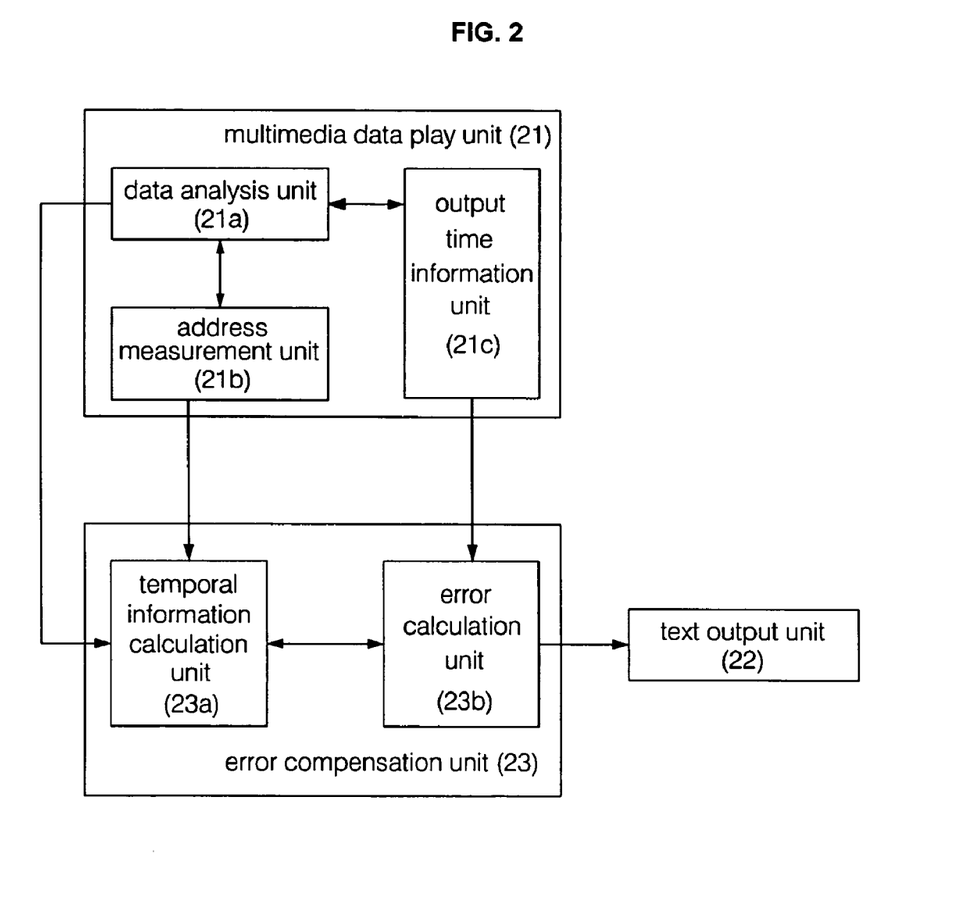
FIG. 2 is a block diagram showing the construction of a multimedia controller of the mobile communication terminal according to an embodiment of the present invention.

FIG. 1 is a block diagram showing the construction of a mobile communication terminal according to an embodiment of the present invention. FIG. 2 is a block diagram showing the construction of a multimedia controller of the mobile communication terminal according to an embodiment of the present invention.

As shown in FIGS. 1 and 2, the mobile communication terminal according to an embodiment of the present invention includes a speaker 70 that outputs audio data of multimedia data that are played, a display unit 40 on which text data of a multimedia data that is played are output, a memory 30 that stores a number of multimedia data, an multimedia controller 20 that plays multimedia data stored in the memory 30 and corrects error occurring as a multimedia data is played, and a controller 10 that controls the input and output of data stored in the memory 30 and drives the speaker 70 and the display unit 40.

The mobile communication terminal further includes a key input unit 50 including a number of key buttons, a microphone 80 that collects surrounding sound, a sound source processing unit 60 that converts voice or multimedia data that are input or output through the microphone 80 or the speaker 70, and a communication module 90 that downloads multimedia source data from the outside.

The communication module 90 transmits and receives multimedia data or text data to and from the outside through a mobile communication network or a wireless/wired network. More particularly, the communication module 90 can download a variety of charged or free multimedia data and text data through access to a multimedia content providing service of the mobile communication network, and can also receive multimedia data from a PC or other mobile communication terminals through a wired or wireless network or a cable.

The communication module 90 may include an Infrared Data Association (IrDA) module, a Bluetooth module, a LAN or a wireless LAN or the like depending on a communication method.

The sound source processing unit 60 converts and amplifies input or output data when the mobile communication terminal performs voice communication or transmits or receives data. In other words, the sound source processing unit 60 converts voice or audio data of multimedia data that are played so that they can be output to the speaker 70, and converts collected data so that they can be read by the controller 10.

The memory 30 includes a multimedia data unit 31 for storing a number of multimedia data downloaded through the communication module 90, and a text data unit 32 for storing text data for a number of multimedia data.

The multimedia data unit 31 stores a number of multimedia data having audio data formats such as MP3, WMA, ASF, OGG and WAV, and video data formats such as AVI, WMA, MPG, RM and MOV. The multimedia data may have Digital rights management (DRM) for content protection set therein.

The text data unit 32 stores text data for each multimedia data stored in the multimedia data unit 31. The text data are mapped to the multimedia data. When multimedia data is played, stored text data corresponding to selected multimedia data are automatically searched and provided.

The multimedia controller 20 plays multimedia data selected from a number of multimedia data of the multimedia data unit 31 according to each audio/video data format, and controls the played multimedia data to be converted through the sound source processing unit 60 and then to be output to the speaker 70.

The multimedia controller 20 includes a multimedia data play unit 21 that plays selected multimedia data, a text output unit 22 that reads text data of a multimedia data that is played and outputs the read text data through the display unit 40, and an error compensation unit 23 that compensates for sync error between multimedia data played by the multimedia data play unit 21 and output text data.

The multimedia data play unit 21 analyzes selected multimedia data to determine play information of multimedia data and controls an audio signal of the selected multimedia data to be output to the speaker 70 according to the play information. The multimedia data play unit 21 may include a codec.

At this time, the multimedia data play unit 21 includes a data analysis unit 21a that analyzes a header for each frame, of the multimedia data, to determine play information in playing compressed and stored multimedia data, and an address measurement unit 21b that measures address information about an output audio signal with respect to played multimedia data.

The multimedia data play unit 21 further includes an output time information unit 21c that updates and manages output time information about played multimedia data.

The data analysis unit 21a analyzes a header of some of selected multimedia data, which are read from the multimedia data unit 31, and reads frame information, an actually stored audio signal and additional information data.

Figure 3:
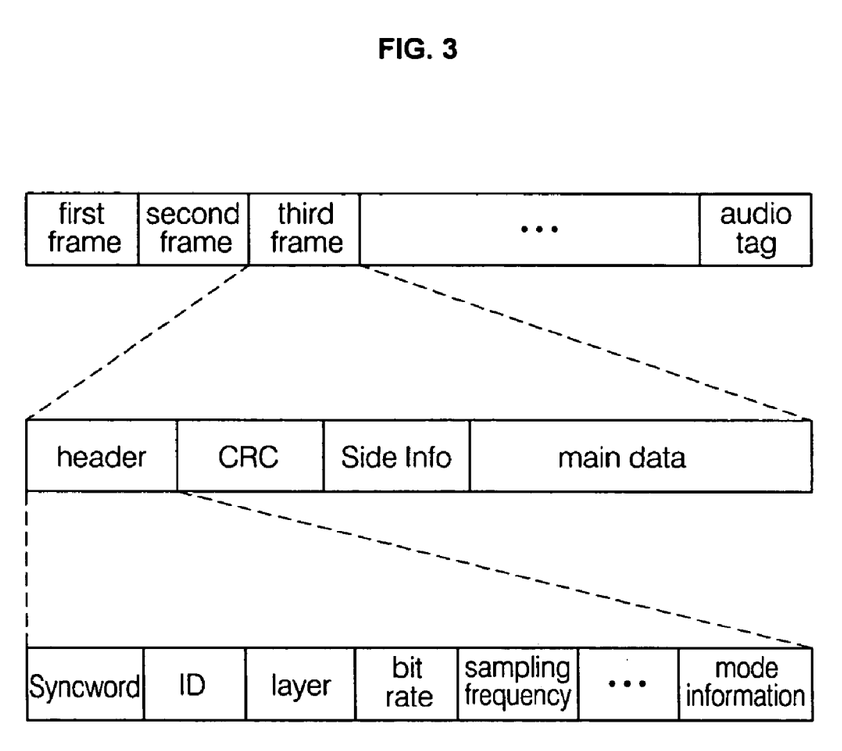
FIG. 3 illustrates a multimedia data structure of the mobile communication terminal according to an embodiment of the present invention.
Figure 4:
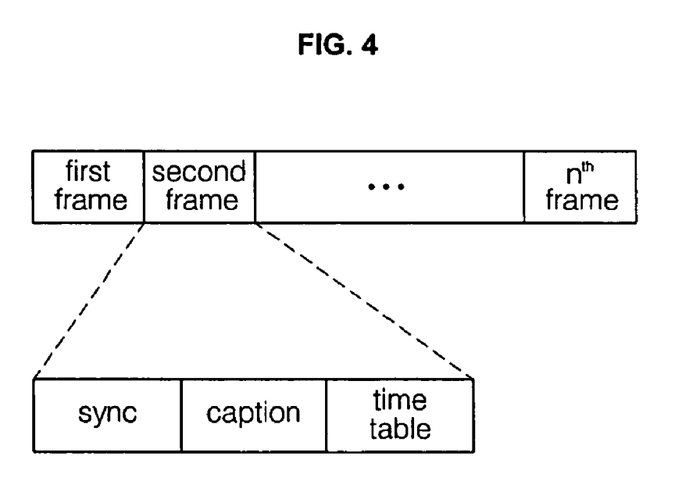
FIG. 4 illustrates a text data structure of the mobile communication terminal according to an embodiment of the present invention.

FIG. 3 illustrates a multimedia data structure of the mobile communication terminal according to an embodiment of the present invention. FIG. 4 illustrates a text data structure of the mobile communication terminal according to an embodiment of the present invention.

As shown in FIG. 3, in the case of MP3 multimedia data, one song consists of a number of frames. Each frame of the multimedia data includes sub information containing a header, CRC and decoding information (side info), and main data (an audio signal).

In the header of the frame are included play information (e.g., audio version information, a bit rate, a sampling frequency and channel mode), frame information and sync of the frame.

As shown in FIG. 4, text data includes a number of frames. Each frame consists of sync (i.e., temporal information at which text data will be output), text data that are actually output, and a time table (i.e., divided display temporal information for the text data). The frames of the text data are the unit of the text data output on one screen.

The address measurement unit 21b periodically measures address information about an audio signal, which is actually output through the speaker 70, with respect to played multimedia data. The address information refers to positional information of read multimedia data and includes a reading point.

If a predetermined amount of read multimedia data is played and output, an output time information unit 21c updates output time information accordingly and stored the updated output time information. The term "output time information" refers to temporal information which uses a time point at which multimedia data is output and played by the multimedia data play unit 21 as a basis.

In other words, the multimedia data play unit 21 reads only a predetermined amount of played multimedia data, collects frame information from the read multimedia data through the analysis of the data analysis unit 21a into a header, plays multimedia data by outputting an audio signal according to play information of the analyzed frame information, and plays multimedia data by repeatedly reading a predetermined amount of multimedia data.

The error compensation unit 23 measures temporal error between the output time information updated by the output time information unit 21c and the audio signal that is actually output through the speaker 70 and calculates compensated temporal information for outputting text data.

The error compensation unit 23 includes a temporal information calculation unit 23a that calculates temporal information about the output audio signal, and an error calculation unit 23b that calculates compensated temporal information by calculating temporal error based on the calculated temporal information.

The temporal information calculation unit 23a calculates temporal information of the audio signal that is actually output based on frame information of multimedia data through header analysis by the data analysis unit 21a and address information of the audio signal, which is periodically measured by the address measurement unit 21b.

In other words, the temporal information calculation unit 23a searches a frame in which the address information of the output audio signal is included based on the address information about the audio signal that is actually output and the analyzed frame information, and calculates temporal information according to the address information based on information about the searched frame.

For example, the temporal information calculation unit 23a may determine the location of the entire multimedia data of a corresponding frame through address information about read multimedia data and calculates temporal information about an address according to a frame size and a compression ratio of the multimedia data when the frame of the multimedia data has a predetermined size.

In other words, in the event that address information of an output audio signal is 1281.28 kb, when the bit rate of analyzed audio data of multimedia data is 128 kbps and an output time managed by one frame is 0.026 ms, temporal information of the output audio signal becomes 10.01 seconds. Alternatively, when the frame is a $385^{th}$ frame, temporal information accordingly also becomes 10.01 seconds.

The error calculation unit 23b compares the temporal information of the audio signal that is actually output, which has been calculated by the temporal information calculation unit 23a, and output time information updated by the output time information unit 21c, and calculates temporal error accordingly.

The error calculation unit 23b also calculates proportional temporal error, which is increased in proportion to the output time information, based on the calculated temporal error. At this time, the proportional temporal error may include temporal error increased as the output time increases, and temporal error which is accumulated and generated as fast wind, rewind, section repeat or long-term multimedia data is played.

For example, the error calculation unit 23b compares error occurring for a predetermined time period, and error in a time corresponding to twice the unit time to calculate proportional temporal error occurring in proportion to time.

Furthermore, the error calculation unit 23b counts the number of fast wind, rewind and section repeat, respectively, while multimedia data are played, and adds or subtracts a counted number to calculate proportional temporal error.

The error calculation unit 23b adds or subtracts the calculated temporal error and the proportional temporal error to or from the output time information to calculate compensated temporal information.

In this case, the error calculation unit 23b may add or subtract the calculated temporal error to or from the output time information, and subtract the proportional temporal error occurring in proportion to the output time to calculate compensated temporal information for outputting text data.

The text output unit 22 outputs the text data on the screen according to the compensated temporal information received from the error compensation unit 23. At this time, the text output unit 22 may search the text data for sync information depending on the compensated temporal information and output text data of corresponding sync information through the display unit 40.

Meanwhile, the controller 10 controls multimedia data, which are received in a wired or wireless manner through the communication module 90, to be stored in the multimedia data unit 31, and also controls text data according to the multimedia data to be stored in the text data unit 32 with the text data being mapped.

The controller 10 retrieves data from the memory 30 with respect to multimedia data selected through the key input unit 50 and transfers the retrieved data to the multimedia controller 20. The controller 10 then searches and transfers text data according to the multimedia data based on the mapping information. At this time, the multimedia controller 20 copies the multimedia data and the text data, which are received from the controller 10, to a buffer (not shown) so that multimedia data is played.

The controller 10 controls data, such as a title, audio/video information and a singer name of a music, that is currently being played as the multimedia data play unit 21 plays multimedia data, and output time information updated by the output time information unit 21c to be output through the display unit 40.

The flow of a signal regarding the play of multimedia data and the output of text data in the mobile communication terminal will be described below.

Figure 5:
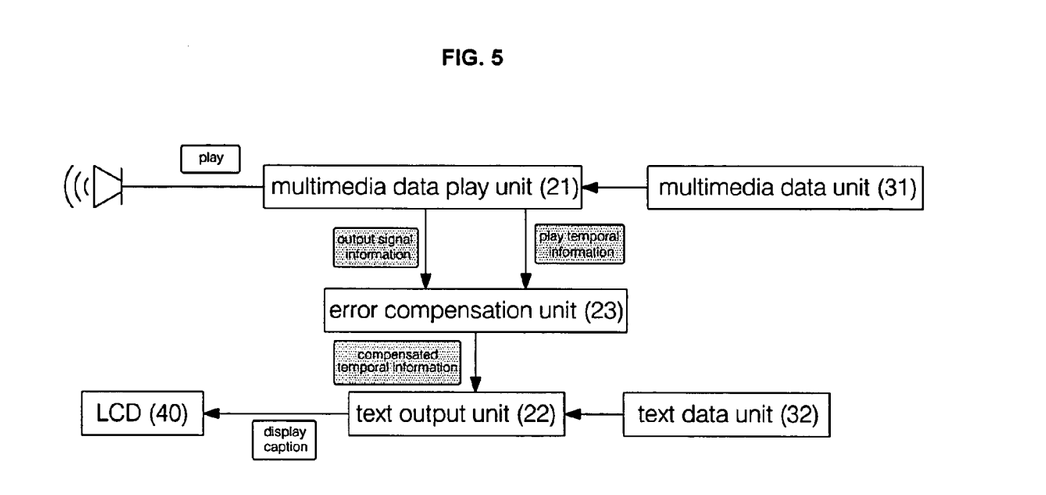
FIG. 5 is a block diagram illustrating the flow of a signal according to compensated sync error of the mobile communication terminal according to an embodiment of the present invention.

FIG. 5 is a block diagram illustrating the flow of a signal according to compensated sync error of the mobile communication terminal according to an embodiment of the present invention.

As shown in FIG. 5, in the mobile communication terminal, a data signal depending on the play of selected multimedia data is transferred to the multimedia controller 20.

In other words, in the mobile communication terminal, selected multimedia data are transferred to the multimedia data play unit 21. The multimedia data are analyzed and a compressed audio signal is played, so that audio data of multimedia data is output to the speaker 70.

At this time, the error compensation unit 23 receives output signal information, such as frame information analyzed by the multimedia data play unit 21 and address information of an output audio signal, and calculates temporal information of an audio signal that is currently being output. The error compensation unit 23 compares the calculated temporal information and output time information updated by the multimedia data play unit 21 in order to obtain temporal error.

Furthermore, the error compensation unit 23 calculates temporal error between an output time and temporal information of an output audio signal, and proportional temporal error occurring in proportion to the output time, and calculates compensated temporal information by adding or subtracting the temporal error and the proportional temporal error to or from the output time. The calculated compensated temporal information is input to the text output unit 22.

The error compensation unit 23 may calculate the compensated temporal information as follows.

Figure 6:
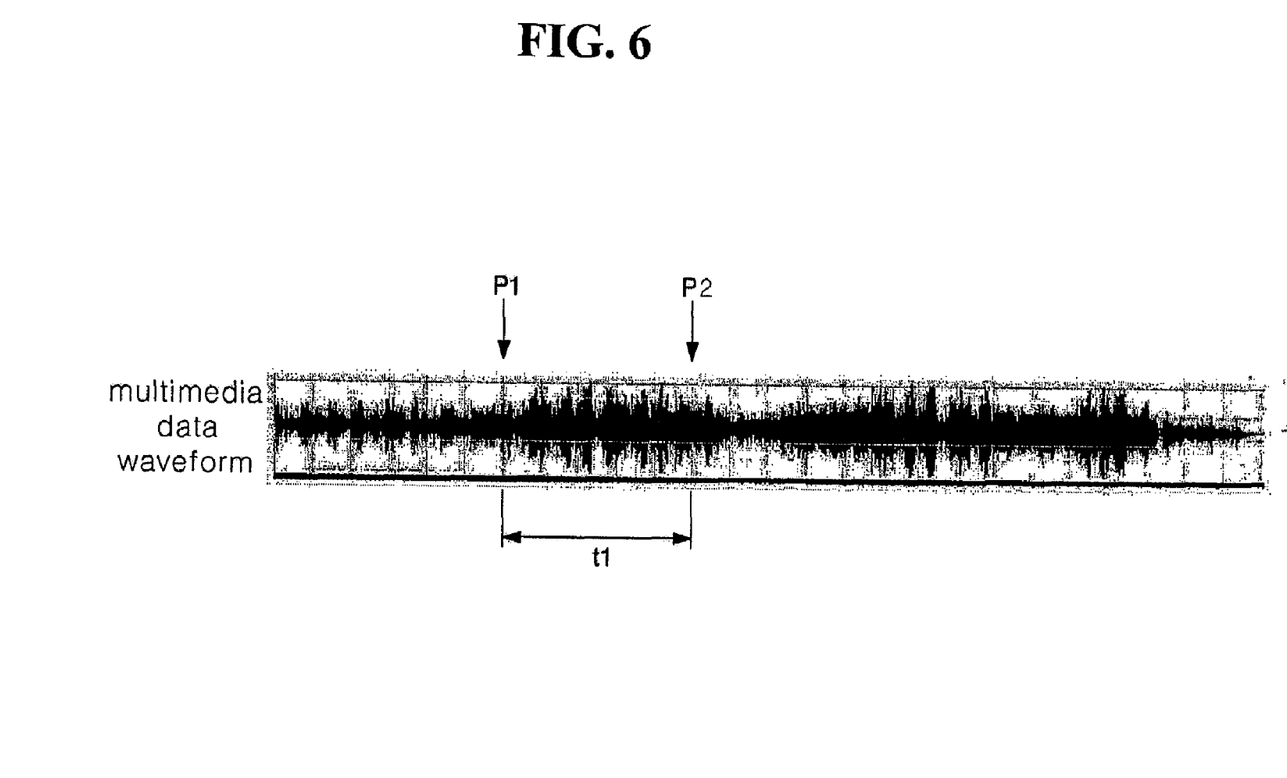
FIG. 6 illustrates a multimedia data waveform according to sync error of the mobile communication terminal according to an embodiment of the present invention.

FIG. 6 illustrates a multimedia data waveform according to sync error of the mobile communication terminal according to an embodiment of the present invention.

As shown in FIG. 6, to obtain compensated temporal information, temporal information is measured based on address information measured with respect to a location P1 of an audio signal that is actually output and analyzed frame information, and temporal error t1 between the location P1 and a signal location P2 according to output time information managed by the multimedia data play unit 21 is calculated.

Meanwhile, the text output unit 22 searches text data for sync information according to received compensated temporal information and outputs corresponding text data through the display unit 40 such as a LCD.

Figure 7:
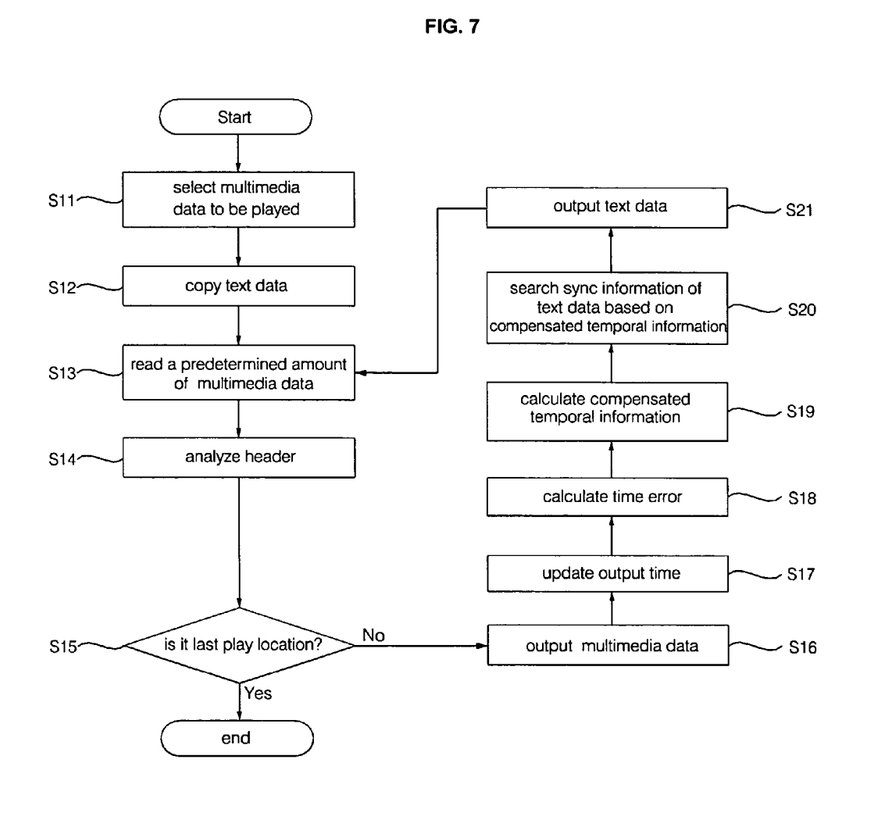
FIG. 7 is a flowchart illustrating a method of compensating for sync error of the mobile communication terminal according to an embodiment of the present invention.
Figure 8:
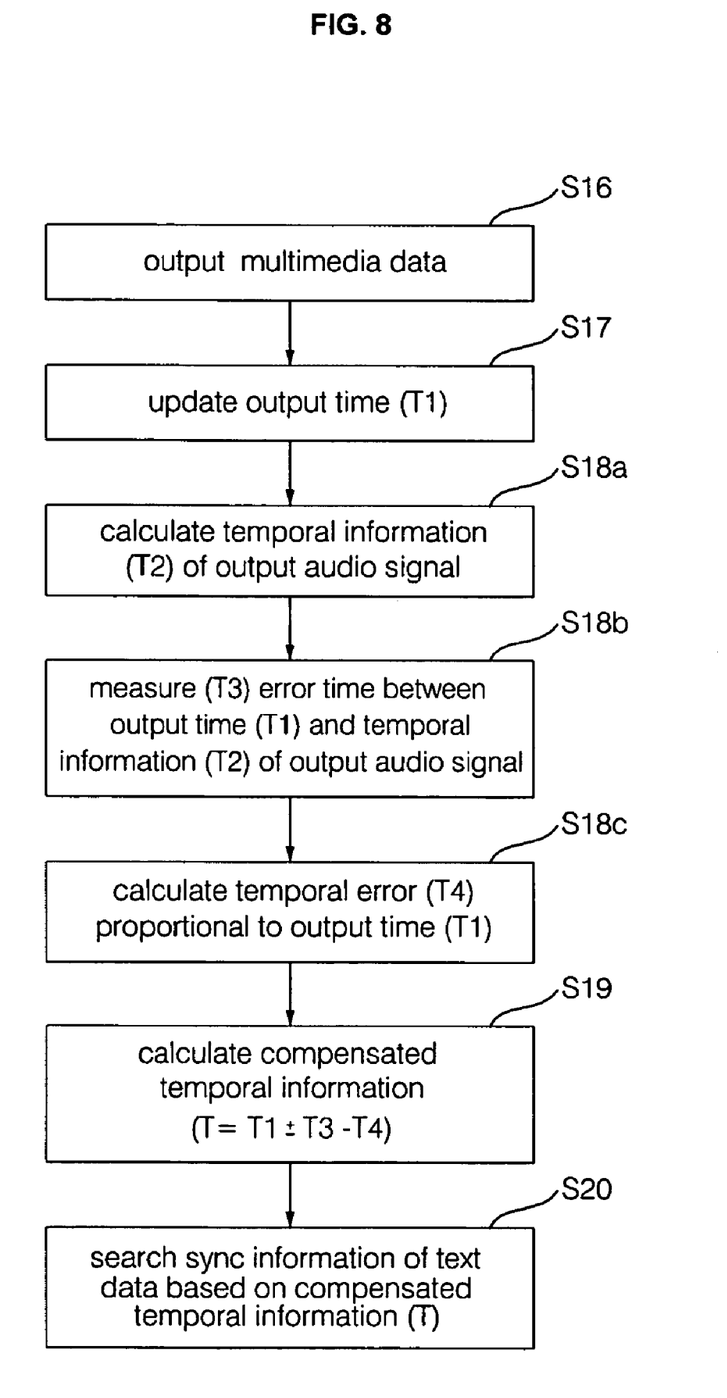
FIG. 8 is a flowchart illustrating a method of calculating compensated temporal information of the mobile communication terminal according to an embodiment of the present invention.

A method of operating the mobile communication terminal constructed as above according to an embodiment of the present invention will be described below with reference to FIGS. 7 and 8. FIG. 7 is a flowchart illustrating a method of compensating for sync error of the mobile communication terminal according to an embodiment of the present invention. FIG. 8 is a flowchart illustrating a method of calculating compensated temporal information of the mobile communication terminal according to an embodiment of the present invention.

Referring to FIGS. 7 and 8, if played multimedia data are selected, the selected multimedia data are temporarily stored in the buffer. Text data (e.g., Caption data) accordingly are then retrieved and copied to the buffer (S11, S12).

Only a predetermined amount of multimedia data, of the played multimedia data, is read and the multimedia data is analyzed (S13, S14).

At this time, a header depending on each frame of the multimedia data is analyzed to read play location and temporal information at the entire multimedia data of a frame to be played, and frame information such as audio signal information included in the frame. Furthermore, address information of the played multimedia data is periodically measured.

It is determined whether the play location is the last play location based on the read frame information. If it is determined that the play location is the last play location, the play of the multimedia data is finished (S15).

If it is determined that the play location is not the last play location, an audio signal stored in the frame is played so that the multimedia data are output. At this time, output time (T1) information about the played multimedia data is updated according to the frame information of the output multimedia data (S16, S17).

Meanwhile, temporal information (T2) about the audio signal that is currently being output is calculated and the temporal information (T2) is compared with the updated output time information to measure compare times (T3, T1-T2) (S18a, S18b).

The temporal information about the output audio signal is calculated based on address information, which is periodically measured with respect to the output audio signal when multimedia data are played, and the frame information of multimedia data analyzed as described above.

For example, the location of a corresponding frame may be determined based on the periodically measured address information and temporal information accordingly may be calculated. Furthermore, when the frame of multimedia data has a predetermined size, temporal information about an address is calculated based on a frame size and a compression ratio of multimedia data.

In other words, the temporal information about the output audio signal can be measured by searching frame information according to address information of an audio signal that is currently being output and then determining a frame in which the audio signal is included.

Proportional temporal error (T4) occurring in proportion to the output time (T1) is calculated based on the temporal error (T3) between the output audio signal and the output time (S18c).

The temporal error between the play of multimedia data and an audio signal that is actually output increases in proportion to its output time as a time at which multimedia data are played is lengthened. Accordingly, the proportional temporal error (T4) according to the output time (T1) is calculated in proportion to the calculated temporal error (T3) as described above.

The temporal error (T3) and the proportional temporal error (T4) calculated as described above are added or subtracted to or from the output time (T1), obtaining compensated temporal information (T, where T=T1±T3−T4) (S19).

The compensated temporal information (T) may be calculated by adding or subtracting the calculated temporal error (T3) to or from the output time (T1) and then subtracting the proportional temporal error (T4).

Sync information of text data is searched based on compensated temporal information and text data corresponding to the sync information is output to the screen (S20, S21).

Accordingly, sync error between output text data of multimedia data can be prevented and accurate text output is made possible accordingly.

In accordance with the mobile communication terminal constructed described above and operating method thereof according to an embodiment of the present invention, text sync error occurring due to temporal error between output time information of the multimedia data play unit 21 when multimedia data is played and an output audio signal can be compensated for. This allows for an accurate text output.

In other words, in accordance with the mobile communication terminal constructed described above and operating method thereof, temporal error between output time information and an audio signal that is actually output, and proportional temporal error occurring in proportion to the output time are calculated. Temporal information is compensated for based on the calculated temporal error and proportional temporal error. Accordingly, the present invention is advantageous in that it can enhance user convenience since sync error can be automatically corrected even without modifying additional text sync.

It is to be understood that the text data defined in the present invention are not limited to text data for audio, but may include all text data for multimedia.

Furthermore, in accordance with a mobile communication terminal and operating method thereof according to an embodiment of the present invention, sync error between played multimedia data and output text data can be prevented to ensure an accurate text output. Accordingly, the present invention is advantageous in that it can improve the reliability of products.

While the invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A mobile communication terminal, comprising:
    a speaker through which audio data are outputted;
    a display unit on which text data are outputted;
    a multimedia controller that analyzes multimedia data, compensates for error of an output time of the text data based on the compensated output time,
    the multimedia controller comprises:
    a multimedia data play unit that plays selected multimedia data and updates output time information according to the play of multimedia data;
    an error compensation unit that calculates compensated temporal information based on a difference between output time information of the multimedia data play unit and an output audio signal; and
    a text output unit that outputs text data based on the compensated temporal information of the error compensation unit; wherein the multimedia data play unit comprises:
    a data analysis unit that analyzes a header of the multimedia data in order to play the selected multimedia data;
    an address measurement unit that measures address information about the output audio signal while multimedia data is played;
    and wherein the error compensation unit comprises:
    a temporal information calculation unit that calculates temporal information about the output audio signal based on the measured address information; and
    an error calculation unit that calculates compensated temporal information by calculating temporal error based on the calculated temporal information, wherein the error calculation unit calculates temporal error between output time information of the multimedia data play unit and the temporal information of the output audio signal, wherein the error calculation unit calculates proportional temporal error occurring in proportion to the output time based on the calculated temporal error, and wherein the error calculation unit adds or subtracts the calculated temporal error to or from the output time information of the multimedia data play unit, and subtracts the proportional temporal error to calculate compensated temporal information.

2. The mobile communication terminal as claimed in claim 1, wherein the data analysis unit reads play information and frame information of the multimedia data by analyzing the header.

3. The mobile communication terminal as claimed in claim 1, wherein the temporal information calculation unit analyzes frame information of the multimedia data and the address information of the output audio signal, and searches frame information in which the address information is included to calculate the temporal information of the output audio signal.

4. The mobile communication terminal as claimed in claim 1, wherein the text output unit searches sync information of the text data based on the compensated temporal information received from the error calculation unit.

5. A method of operating a mobile communication terminal, the method comprising the steps of:
    analyzing and playing multimedia data;
    comparing output time information depending on the play of multimedia data and temporal information of an output audio signal, and compensating for temporal error based on the comparison result; and
    outputting text data based on the calculated compensated temporal information; wherein the step of compensating for the temporal error comprises the steps of:
    measuring temporal information of an audio signal output through a speaker;
    comparing the output time information and the temporal information of the output audio signal to obtain temporal error; and calculating compensated temporal information depending on the temporal error;

wherein the step of compensating for the temporal error further comprises the step of calculating proportional temporal error occurring in proportion to an output time based on the calculated temporal error;

wherein the compensated temporal information is calculated by adding or subtracting the calculated temporal error to or from output time information and subtracting the proportional temporal error.

6. The method as claimed in claim 5, wherein the step of playing the multimedia data comprises the steps of:

collecting play information and frame information by analyzing a header of the multimedia data; and outputting multimedia data based on the analyzed play information and updating an output time.

7. The method as claimed in claim 6, wherein the step of playing the multimedia data further comprises the step of periodically measuring address information of the output audio signal with respect to the played multimedia data.

8. The method as claimed in claim 5, wherein a frame in which the address information is included and temporal information of the output audio signal are calculated based on the analyzed frame information and address information of multimedia data that are periodically measured.

9. The method as claimed in claim 5, wherein the step of outputting the text data includes searching sync information of text data according to the compensated temporal information and outputting the text data according to the sync information to a screen.

* * * * *